United States Patent Office 3,468,421
Patented Sept. 23, 1969

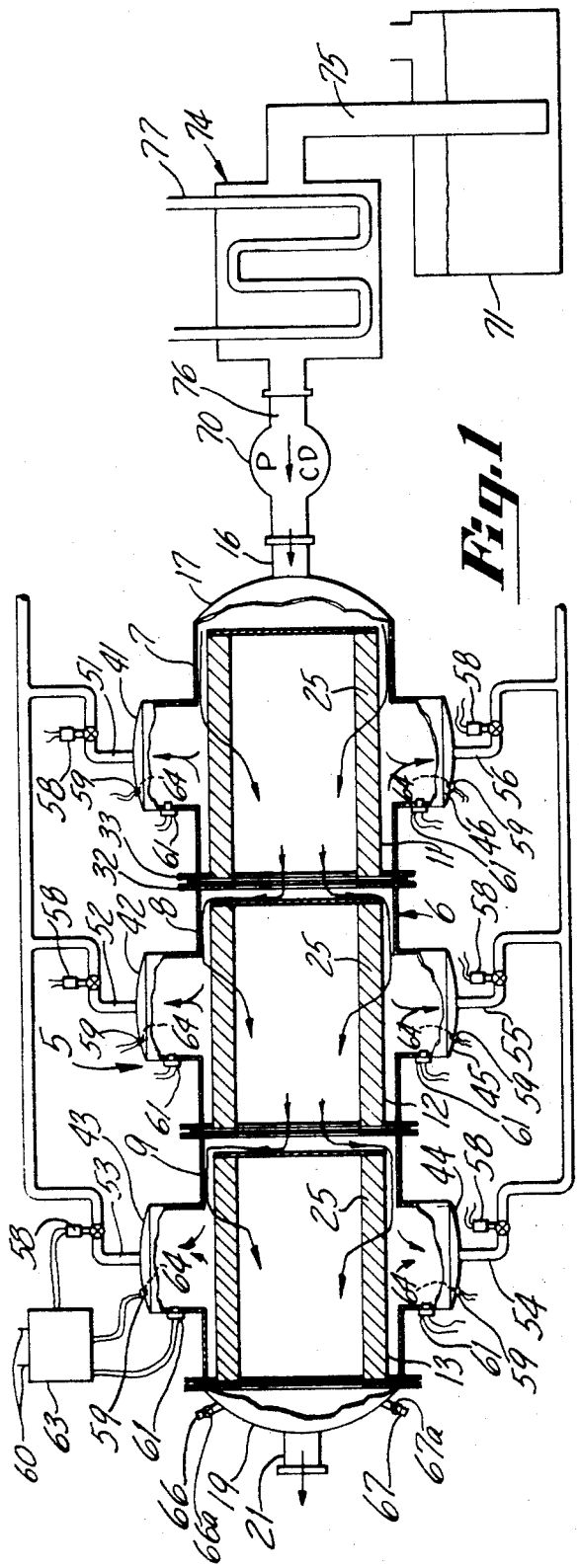
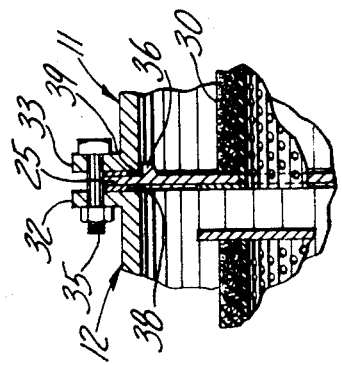
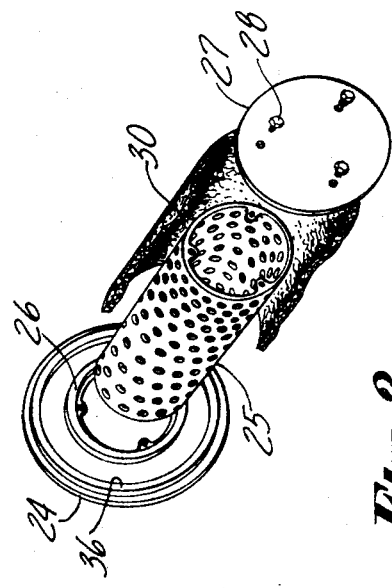

3,468,421
SEPARATOR FOR IMMISCIBLE LIQUIDS
Beverly S. Hazel, Chagrin Falls, and Lubertus Bakker, Cleveland Heights, Ohio, assignors to Midland-Ross Corporation, Cleveland, Ohio, a corporation of Ohio
Filed July 3, 1967, Ser. No. 650,747
Int. Cl. B01d 29/04
U.S. Cl. 210—96                                                    1 Claim

ABSTRACT OF THE DISCLOSURE

A horizontal-flow liquid separator especially constructed for separating immiscible liquids in the form of an emulsion wherein the dispersed liquid comprises one or more compounds having specific gravities slightly above, below, or approximately equal to that of the carrier liquid.

DESCRIPTION

In the operation of ships which have power plants which use oil as a fuel, empty space in fuel tanks caused by the consumption of oils is filled with water to maintain a desirable trim of the ships. Water in use for this purpose is known as ballast water. Prolonged contact of the water with any oil remaining in the tank tends to emulsify the oil. A factor conducive to the formation of emulsions, and especially stable emulsions, is a predominance of any compounds in the oil which have a specific gravity close to that of the water sharing the same fuel tank. The water itself may vary in specific gravity from that of fresh water to that of sea water depending on the character of the natural body of water from which the ballast water is taken.

On account of the practice of refueling ships in intercontinental service at widely geographically dispersed points along routes of travel, the chemical and physical character of the fuels which enter the fuel tanks of the vessel may and, in fact, do vary in respect to specific gravity. During refueling, the ship must make fuel space available by discharging ballast water.

There are now restrictions imposed by international agreement rendering unlawful the discharge of water pollutants into high seas. For example, ballast water must not be discharged if it contains greater than 100 parts per million (p.p.m.) of oil. Violations of this requirement are known to be widespread and caused in a large measure by the lack of efficient equipment for reducing the oil in the ballast water to the legal limit during its disposal from the ship.

Hence an essential object of the invention is to provide an immiscible liquid separator for liquids which have similar, or not substantially different, specific gravities.

It is another object to separate dispersed liquid components from the carrier liquid of an emulsion which have both greater and lesser specific gravities than the carrier liquid and to carry out such separations simultaneously or in accordance with separate occurrences of such components in a carrier liquid.

A specific object is to provide an efficient separator for separating the dispersed and carrier liquids of ballast water of the type pumped from the fuel tanks of oil-burning ships.

These objects, are in general, accomplished in apparatus comprising a horizontal-flow liquid separator having multiple coalescing units of generally cylindrical configuration in which inflowing liquid in any one section is directed in the longitudinal direction of the separator against a flat transverse end wall of the next adjacent downstream coalescing unit to establish a desired rate of emulsion flow throughout the regions surrounding the coalescing unit, a constant delivery pump operating in cooperation with the internal separator structure to establish such predetermined rate of emulsion flow within the separator, and a housing constituting the outer shell of the separator having upper and lower domes or extensions of the main body of the housing in vertical relation with each of the coalescing units providing chambers for collecting coalesced initially dispersed components of the emulsion which vary in specific gravities above and below that of the carrier liquid.

In the drawing with respect to which this invention is described:

FIG. 1 is a longitudinal elevation drawn in schematical vertical section with respect to a liquid separator, and diagrammatically with respect to a pump, a heat exchanger, and a fuel tank;

FIG. 2 is a perspective exploded view of a coalescing unit included in the liquid separator of FIG. 1; and FIG. 3 is a fragmentary elevation in section illustrating detailed structure of connection of two sections of the liquid separator.

As seen diagrammatically in FIG. 1, a liquid separator 5 comprises an outer housing 6 having an upstream section 7, a middle section 8, and a downstream section 9. Housing sections 7, 8, and 9 contain coalescing units 11, 12, and 13, respectively. The upstream section 7 has an inlet means such as the inlet port 16, and attached to and opening through the upstream end wall 17 of the main body of the housing in approximately centered relation with its longitudinal axis. The housing has a detachable downstream end wall 19 provided with a flange adapting it to be attached to the downstream section 9 as shown. Outlet means of the housing, such as the outlet duct 21, is attached to and opens through the downstream end wall 19 approximately along the longitudinal axis of the housing.

The coalescing units 11, 12, 13 may be of similar construction and may take the form shown in exploded view in FIG. 2, comprising an annular flange 24, a perforate cylindrical sleeve 25 received within a circular positioning ridge 26 of the flange and secured to the flange by bolts, a flat disc-shaped end wall 27 which is imperforate except for openings for the bolts 28 which secure the end wall to the sleeve 25, and a coalescing cylinder 30 formed of a glass fiber of other fibrous or particulate material providing a network of small continuous interstices in a radial direction through the cylinder wall. The cylinder 30 has an inner periphery of a diameter agreeing closely with the outer diameter with the sleeve 25 and is of a length agreeing with that of the sleeve 25 adapting it to fit tightly between a portion of the disc 27 protruding beyond the sleeve and the flange 24, especially the ridge 26 thereof. The outer periphery of the flange 24 is of a diameter adapting it to be supported between the flanges 32 and 33 of the adjacent housing sections as shown in FIG. 3 but within the circle along which bolts 35 extend through the flanges 32 and 33. To properly position the flange 24 within the housing, the flange has a positioning ridge 36. Gaskets 38 and 39 are located between the adjacent surfaces of a section and the flange 24 prevents leakage. The various other sections or components of the housing are connected in a similar manner.

The cylindrical wall formed by the coalescing cylinder 30 may, e.g., in the practice of this invention, comprise glass fiber of approximately two inches in thickness with a density of about three pounds per cubic foot. Preferably, the wall comprises an outer batting or stratum of coarser denier fiber having a density of about five pounds per cubic foot with an inner stratum of finer denier and less density. However, other efficient coalescing media are known to the immiscible liquid separating art, such as sintered metal preforms, porous particulate ceramic material, fine metal wire, synthetic fibers, and other substantially inert foraminous materials.

As shown, each section of the housing has upper and lower projections or domes 41 to 46 which collect the dispersed liquid after coalescence to a globule size which prevents passage through a downstream coalescing unit and, hence, separation from the carrier liquid. All collecting domes are provided with an outlet duct (see ducts 51 to 56) through which liquid passage is controlled by pressure-sensitive and oil-sensitive means comprising, e.g., a solenoid-operated valve 58, an electrical potential-measuring device 59 sensitive to the difference in conductivity of oil and water, and an electrically operated pressure-sensitive device 61 of the types commercially available. The responses of devices 59 and 61 to conditions in the dome are, for example, electronically registered within the electrical control unit 63 to open the valve 58 when oil is present within one of the domes, if the pressure in that section is above a control level, and to close the valve when the carrier liquid contacts the electrode 64 of the sensing device 59. While the control system for removing liquid is shown only with respect to dome 43, similar control systems effect oil discharge from each of the other domes.

The dome-unloading system just described operates as the result of slight fluctuations in pressure which occur within a housing section when collection of oily material has reached an extent interfering with the passage of the carrier liquid or emulsion into the coalescing cylinder of that section. Oily material having a specific gravity close to that of the carrier liquid associates itself with the collected oily liquid filling either the top dome or bottom dome of the section in which it effects collection. In the rare emergency that small amounts of coalesced material of the dispersed phase should pass through the most downstream unit 13 and collect along the inner surface of the downstream end wall 19, top and bottom outlets 66 and 67 including valves 66a, 67a are provided for the purpose of purging this region of the liquid separator of oily material.

Important in the operation of the separator 5 is the passage of liquid downstream from the inlet duct 16 or from the coalescing units 7, 8 to achieve the slow rates of flow desired along the outer surfaces of the coalescing cylinders 30. Preferably, effluent issues in inlet 16 or units 11 and 12 against the flat upstream walls of units 11, 12, and 13 to cause such effluent to spread out in all radial directions to the outer surfaces of the cylinders 30. In this manner, internal deflecting means is provided for avoiding "channeling" or rapid currents in the regions of the separator wherein globules of oily material are large enough to be disinclined to enter a coalescing cylinder. Such globules are thus free to collect in larger bodies and drift into one or other of the collecting domes.

Liquid is supplied to the separator by a pump 70 of suitable type known to the pumping art for maintaining constant discharge into the separator 5. Supply means for the pump is a tank 71 which, in the use of contemplated herein, is a fuel tank of an ocean-going vessel. Since there is usually advantage in maintaining the temperature of the liquid entering a liquid separator utilizing coalescing media, the apparatus herein described advantageously includes a heat exchanger 74 through which ballast water or other emulsion may be drawn with the inlet thereof being the duct 75 and its outlet duct 76 being the inlet duct for the pump 70 connected as shown with the separator 5. The heat exchanger 74 includes a coil 77 through which fluid heating or cooling medium may be circulated.

In the operation of the apparatus shown in FIG. 1, an emulsion containing as a dispersed phase, one or more liquid components of oily nature, is pumped preferably at a constant rate by the pump 70 through the separator 5. As there is normally some coalesced or free-floating oily liquid carried in the effluent of the pump, this liquid, depending on its specific gravity relative to that of the carrier liquid, collects in domes 41 or 46. The emulsion is pumped at a rate into the separator which causes the velocity thereof longitudinally of the separator within the regions surrounding the coalescing cylinder of each unit at a rate not substantially greater than one inch per second. The emulsion enters the coalescing cylinder along substantially all of its outer surface if that section of the separator is not close to a condition for unloading collected oily liquid.

In passing through the cylinder 25 along substantially all of its outer surface, the dispersed liquid of the emulsion undergoes an initial stage of coalescence in which some of the dispersed phase, i.e., the larger globules thereof combine into still larger globules that are incapable of passing through the next coalescing unit 12. The preliminary coalescing unit 11 also accomplishes coalescing of the minute particles of the dispersed material to globule sizes which remain capable of passing into the coalescing cylinder of unit 12 to be further coalesced into still larger globules. Coalescence is normally completed in the second section and the material coalesced therein reaches a globule stage which prevents it from passing through the third stage coalescing unit 13. Hence unit 13 functions primarily as a separator with a considerable portion of the dispersed material originally in the emulsion collecting in domes 43 or 44. The separator 5 is deemed to be functioning normally if a minor percentage of the dispersed material is collected in the upstream section 7, about 50 percent of the dispersed material in the middle section 8, and the remainder in the downstream section 9. With satisfactory regulation of the input of the separator, completely clear liquid is removed through the outlet duct 21 and there is no collection of oily liquid adjacent valves 66a or 67a.

The separator and associated apparatus is designed to operate at approximately normal room temperature with the provision that if unusual temperature of the emulsion supplied thereto should prevail, heating or cooling may be performed by a device, such as the heat exchanger 74. Removal of the coalesced originally dispersed material through the ducts associated with the collecting domes may be performed by manual valve means, or automatically by the pressure sensing means and hydrophilicly sensitive means functioning cooperatively to signal the control valve 58 as explained hereinabove to unload any corresponding collecting dome 41 to 46.

What is claimed is:

1. Apparatus for separating the suspended liquid from the carrier liquid of a suspension formed by two immiscible liquids comprising:

an outer housing having inlet means through its upstream end wall, outlet means through its downstream end wall, its length oriented in a generally horizontal direction between said end walls, and defining a path for liquid extending from said inlet means to said outlet means;

a plurality of coalescing units supported in series relation within and lengthwise of the housing;

each unit having an annular coalescing wall in spaced relation with the housing with its annular cross section in perpendicular relation to the length of the housing, a flat imperforate end wall closing the upstream end of the annular wall, and a flange-like imperforate wall extending between the inner periphery of the annular wall to the inner periphery of the housing to close off the region surrounding the annular wall from any region downstream from the flange-like wall whereby liquid from the inlet means is forced radially inwardly through the annular wall;

said housing having a main body and upper and lower domes projecting therefrom in vertical relation with each coalescing wall for removing from said carrier liquid coalesced liquids of greater and less specific gravity than said carrier liquid;

said housing having a downstream end wall and a duct therethrough defining said outlet and located for removing liquid at approximately midheight of said end wall, said duct communicating directly with the downstream end of the internal region of the most downstream coalescing unit;

means for supplying liquid to the housing through said inlet, and deflecting means within the housing establishing a predetermined rate of flow through regions enclosed by the housing externally of said coalescing walls;

duct means including valve means for each dome for removing said suspended liquid after coalescing and collection thereof within the dome; and control means comprising means sensitive to an increase in pressure above a desired operating pressure in said separator, and means sensitive to differences in electrical conductivity of immiscible liquids cooperating within said control means to open and close said valve means.

References Cited

UNITED STATES PATENTS 2,960,234 11/1960 Fredrickson.
3,034,656 5/1962 Kasten.
3,186,551 6/1965 Dornauf.

REUBEN FRIEDMAN, Primary Examiner

JOHN ADEE, Assistant Examiner

U.S. Cl. X.R.

210—115, 339